(12) United States Patent
Bruna Estrach (10) Patent No.: US 9,288,535 B2
(45) Date of Patent: Mar. 15, 2016

(54) CADENCE DETECTION FOR INTERLACED VIDEO BASED ON TEMPORAL REGULARITY

(75) Inventor: Joan Bruna Estrach, Paris (FR)

(73) Assignee: ZORAN (FRANCE) S.A., Neuilly-Sur-Seine (FR)

( * ) Notice: Subject to any disclaimer, the term of this patent is extended or adjusted under 35 U.S.C. 154(b) by 522 days.

(21) Appl. No.: 13/638,855

(22) PCT Filed: Nov. 24, 2010

(86) PCT No.: PCT/EP2010/068133
§ 371 (c)(1),
(2), (4) Date: Oct. 1, 2012

(87) PCT Pub. No.: WO2011/120600
PCT Pub. Date: Oct. 6, 2011

(65) Prior Publication Data
US 2013/0022283 A1    Jan. 24, 2013

Related U.S. Application Data

(60) Provisional application No. 61/320,582, filed on Apr. 2, 2010.

(51) Int. Cl.
*H04N 21/4402*    (2011.01)
*H04N 5/14*    (2006.01)
*H04N 7/01*    (2006.01)

(52) U.S. Cl.
CPC ....... *H04N 21/440281* (2013.01); *H04N 5/145* (2013.01); *H04N 7/012* (2013.01); *H04N 7/0115* (2013.01)

(58) Field of Classification Search
CPC .......... H04N 5/145; H04N 21/440281; H04N 7/012; H04N 7/0115
See application file for complete search history.

(56) References Cited

U.S. PATENT DOCUMENTS 5,365,280 A * 11/1994 De Haan et al. ............... 348/699
2003/0156301 A1 * 8/2003 Kempf et al. ................. 358/486
(Continued)

FOREIGN PATENT DOCUMENTS

WO    2007115583 A1    10/2007
WO    2009087493 A1    7/2009

OTHER PUBLICATIONS

Piedad Brox et al: "Local picture-repetition mode detector for video de-interlacing", pp. 1-10—not dated.
(Continued)

*Primary Examiner* — Jefferey Harold
*Assistant Examiner* — Sean Haiem
(74) *Attorney, Agent, or Firm* — The Marbury Law Group, PLLC (57) ABSTRACT

A method is proposed for analyzing an interlaced video signal including a first sequence of fields. A temporal regularity estimation process is applied to the first sequence of fields to compute a first metric. Inputs of the temporal regularity estimation process include pixel values from at least two fields having respective ranks differing by more than one in the sequence. The same temporal regularity estimation process is applied to second and third sequences of fields to compute second and third metrics. The second sequence is derived from the first sequence by swapping fields having ranks of the form 2k and 2k+1 for any integer k, while the third sequence is derived from the first sequence by swapping fields having ranks of the form 2k−1 and 2k. The first, second and third metrics are compared in a determination of the time arrangement of the fields in the first sequence.

15 Claims, 3 Drawing Sheets

(56) References Cited

U.S. PATENT DOCUMENTS

| | | | |
|---|---|---|---|
| 2006/0187341 A1* | 8/2006 | Fuji | 348/441 |
| 2007/0040942 A1* | 2/2007 | Yamauchi | 348/558 |
| 2008/0259206 A1* | 10/2008 | Lu et al. | 348/448 |
| 2008/0278623 A1* | 11/2008 | Lu et al. | 348/452 |
| 2009/0167939 A1* | 7/2009 | Yamauchi | 348/448 |

OTHER PUBLICATIONS

International Search Report and Written Opinion of the International Searching Authority, dated Feb. 4, 2011.

* cited by examiner

CADENCE DETECTION FOR INTERLACED VIDEO BASED ON TEMPORAL REGULARITY

BACKGROUND OF THE INVENTION

The present invention relates to the technology of video signal processing and more particularly to analysis methods usable to determine the arrangement in time of the fields forming an interlaced video signal.

Such analysis methods are useful for detecting the cadence of the interlaced video signal, which is an important detection to decide which processing should be applied to the signal for display. From the following discussion, it will be seen that the determination of the time arrangement of the fields in the sequence may also involve other aspects such as detecting certain spurious field inversions.

Current television standards (e.g. PAL, NTSC, 1080i, ... ) use interlaced signals, with frames split into two fields, one containing the odd lines of the frame and the other one containing the even lines. A deinterlacer using line duplication or interpolation is used when the display or other processing applied to the signal needs to recover or synthesize full frames. Any deinterlacer must know the native temporal frequency of the input, i.e. the cadence of the signal.

Video transmission technologies use different cadences depending on the source of the signal and characteristics of the transmission channel. For example, films are usually shot at 24 frames per second, while video contents for TV are shot at 50 frames per second in Europe and at 60 frames per second in America. The contents are mostly broadcasted in interlaced form, which means that of each frame, alternatively the even and odd lines are actually transmitted. These formats are denoted as 50i (for 50 interlaced fields per second in the PAL world) or 60i (60 interlaced fields in the NTSC world). The content is also sometimes broadcasted in progressive form. The resulting formats are then denoted 50p or 60p, where "p" is for "progressive frames". Obviously the problem of deinterlacing arises for 50i or 60i contents only.

In Europe, the PAL channel (or 1080i50 for HDTV) assumes a frame refresh rate of 50 Hz on the display side. The frame rate of a film is accelerated from 24 to 25 Hz when broadcast in European TV channels or recorded in optical storage media intended for the European market. A sequence of frames A, B, C, D, . . . from the source becomes, in the interlaced video signal, a sequence of fields:

$A^-$, $B^+$, $C^-$, $D^+$ ("+" for fields made of even lines, "−" for fields made of odd lines) if the source is "video". The cadence is then said to be video (each field is shot at a different time);

$A^-$, $A^+$, $B^-$, $B^+$, $C^-$, $C^+$, $D^-$, $D^+$ if the source is "film". The cadence is then referred to as 2:2 pulldown.

In America and Japan, the NTSC channel (or 1080i60 for HDTV) assumes a frame refresh rate of about 60 Hz on the display side. A sequence of frames A, B, C, D, . . . from the source becomes, in the interlaced video signal, a sequence of fields:

$A^+$, $B^-$, $C^+$, $D^-$ if the source is "video". The cadence is then said to be video;

$A^+$, $A^-$, $A^+$, $B^-$, $B^+$, $C^-$, $C^+$, $C^-$, $D^+$, $D^-$ if the source is "film". The cadence is then referred to as 3:2 pulldown.

Other cadences or pulldown modes exist for interlaced signals having a field rate more than twice the frame rate of the source, for example 2:2:2:4 pulldown, 2:3:3:2 pulldown, 3:2:3:2:2 pulldown, etc. Those other pulldown modes, as well as 3:2, are fairly easy to detect because certain fields are exactly repeated at predictable intervals. For instance, the 3:2 pulldown case as exemplified above is detected by correlating each field with the one appearing two field positions afterwards: a correlation peak every five fields (corresponding to the repetition of $A^+$ and $C^-$ in the example) then reveals the 3:2 pulldown mode. Different time correlation patterns are indicative of different pulldown modes and can be used to detect the relevant cadence in order to apply the appropriate downstream processing.

However, this kind of detection with time correlation cannot be used to detect 2:2 pulldown which is the most difficult film cadence to detect. When the cadence is 2:2, each field is sent only once. Hence the cadence detection technique must rely on some sort of regularity assumption in order to detect that successive fields correspond to the same temporal position.

Typically, a cadence detector handles the 2:2 case by comparing how a given field $F_i$ relates to both $F_{i-1}$ and $F_{i+i}$ (i denoting an integer rank for the fields of the sequence). The metric used to compare fields can be a simple $L_1$ or $L_2$ distance. If a global bias of regularity is detected, e.g. if the metric between pairs of fields of ranks (2k, 2k+1) is much lower than the metric between pairs of fields of ranks (2k−1, 2k), or vice-versa, then the algorithm decides to switch to 2:2 mode and deinterlacing is replaced by reverse 2:2 pulldown. If there is no bias of regularity, the video mode is considered detected and deinterlacing takes place.

The key aspect of these cadence detectors is that they rely on spatial regularity assumptions on the input frames. On frames with high frequency contents however, these assumptions do not hold and thus the algorithms do not correctly detect the 2:2 cadence.

There is thus a need for an interlaced signal analysis method with improved performance, in particular capable of efficiently detecting a 2:2 cadence.

SUMMARY OF THE INVENTION

A method of analyzing an interlaced video signal is proposed. A first sequence of fields having respective integer ranks forms the interlaced input signal for the method which comprises:

applying a temporal regularity estimation process to the first sequence of fields to compute a first metric, wherein inputs of the temporal regularity estimation process include pixel values from at least two fields having respective ranks differing by more than one;

applying the temporal regularity estimation process to a second sequence of fields to compute a second metric, wherein the second sequence of fields is derived from the first sequence by swapping fields having ranks of the form 2k and 2k+1 for any integer k;

applying the temporal regularity estimation process to a third sequence of fields to compute a third metric, wherein the third sequence of fields is derived from the first sequence by swapping fields having ranks of the form 2k−1 and 2k for any integer k; and comparing the first, second and third metrics in a determination of a time arrangement of the fields in the first sequence.

The proposed method considers the regularity of the sequence which induced by motion. The metric is computed between more than 2 fields. For example, a three-field based metric measures the temporal regularity of a video sequence based on best temporal matching. Then, if the input cadence is 2:2 and not video, this metric is invariant under the corresponding field permutation. Conversely, if the input sequence corresponds to video contents, any field permutation creates oscillatory trajectories (with irregular temporal motion) which are penalized by the metric.

A suitable comparison between the metrics obtained by swapping fields can thus be used to detect the cadence or another field arrangement in the sequence.

In particular, the determination of the time arrangement may comprise:

a/ if the first and second metrics are of the same order of magnitude and substantially smaller than the third metric, detecting a 2:2 cadence in the first sequence of fields such that a frame to be displayed combines two fields having ranks of the form 2k and 2k+1 for an integer k; and b/ if the first and third metrics are of the same order of magnitude and substantially smaller than the second metric, detecting a 2:2 cadence in the first sequence of fields such that a frame to be displayed combines two fields having ranks of the form 2k−1 and 2k for an integer k.

If it is known or safe to assume that there are no field inversions in the interlaced signal, any situation other than a/ and b/ above following the comparison of the metrics may give rise to detection of a video cadence, or to submitting the signal to a conventional kind of cadence detector dealing with cadences other than 2:2 (e.g., video and 3:2, 2:2:2:4, etc.). Otherwise, the determination of the time arrangement may further comprise:

c/ if the second metric is substantially smaller than both the first and third metrics, detecting a field inversion in the first sequence of fields such that fields having ranks of the form 2k and 2k+1 are inverted for an integer k; and d/ if the third metric is substantially smaller than both the first and second metrics, detecting a field inversion in the first sequence of fields such that fields having ranks of the form 2k−1 and 2k are inverted for an integer k.

If a situation other than a/, b/, c/ and d/ above results from the comparison of the metrics, a video cadence can be detected in the first sequence of fields. Alternatively, the first sequence of fields can be passed to a standard cadence detector to determine whether the signal has another kind of pull-down mode.

The proposed method can be combined with classic spatial regularity assumptions to yield unprecedented robustness in 2:2 cadence detection, in particular when the video frames have sharp contents with high vertical frequencies.

Mixed modes such as video over film can also benefit from the method since the analysis can be carried out locally in different regions of the images.

In an embodiment, the temporal regularity estimation process is such that the metric computed for a field rank t in a given sequence of fields includes a sum of minimum loss values respectively associated with reference pixels having no pixel value in the field of rank t of the given sequence. The minimum loss value associated with a reference pixel is typically obtained by minimizing, over a set of candidate displacements, a loss function depending on pixels values provided in at least two fields having respective ranks differing by more than one in the given sequence at pixel positions determined from a position of the reference pixel and a candidate displacement.

Different kind of loss functions can be envisaged.

One of them has a gradient component given by a distance between a pixel value provided at a position (x+u, y+v) in the field of rank t+1 and a pixel value provided at a position (x−u, y−v) in the field of rank t−1, where (x, y) denotes the position of the reference pixel and (u, v) is a candidate displacement.

The loss function may also have an insertion component given by a distance of an interpolated pixel value to an interval of pixel values. The interpolated pixel value is a mean value between a pixel value provided at a position (x+u, y+v) in the field of rank t+1 and a pixel value provided at a position (x−u, y−v) in the field of rank t−1. The interval of pixel values has bounds given by two respective pixel values provided at positions immediately above and immediately below the position (x, y) of the reference pixel in the field of rank t.

Alternatively, the insertion component may be given by a minimum between a distance of a first interpolated pixel value to the interval of pixel values, a distance of a second interpolated pixel value to the interval of pixel values and a distance of a third interpolated pixel value to the interval of pixel values. The first interpolated pixel value is a mean value between a pixel value provided at a position (x+u, y+v) in the field of rank t+1 and a pixel value provided at a position (x−u, y−v) in the field of rank t−1. The second interpolated pixel value is a mean value between a pixel value provided at a position (x+2u, y+2v) in the field of rank t+1 and a pixel value provided at the position (x, y) in the field of rank t−1. The third interpolated pixel value is a mean value between a pixel value provided at the position (x, y) in the field of rank t+1 and a pixel value provided at a position (x−2u, y−2v) in the field of rank t−1.

Another aspect of the invention relates to an interlaced video signal analyzer, comprising:

a temporal regularity estimation stage arranged for receiving a plurality of input field sequences and, for each input field sequence, computing a respective metric based on pixel values from at least two fields having respective ranks differing by more than one in said input field sequence;

a field distribution stage arranged for receiving the interlaced video signal as a first sequence of fields, for deriving a second sequence of fields by swapping fields of the first sequence having ranks of the form 2k and 2k+1 and a third sequence of fields by swapping fields of the first sequence having ranks of the form 2k−1 and 2k for any integer k, and for providing the first, second and third sequences as input field sequences to the temporal regularity estimation stage; and a comparison stage for comparing first, second and third metrics computed by the temporal regularity estimation stage for the first, second and third sequences, respectively.

Other features and advantages of the method and apparatus disclosed herein will become apparent from the following description of non-limiting embodiments, with reference to the appended drawings.

DESCRIPTION OF PREFERRED EMBODIMENTS

An input video signal consists of a sequence of fields having integer ranks t. The signal can be considered as an array of pixels $F_t(x, y)$, where x and y are the horizontal and vertical coordinates of the pixels and t is the rank of the field $F_t$, x and y being also represented as integers. To account for the interlaced form of the signal, we assume that for some parity p=0 or p=1, all the pixels $F_t(x, y)$ for which (y+t)=p (mod 2) have a value provided in the field sequence while pixels $F_t(x, y)$ for which (y+t)≠p (mod 2) are unknown or have a special value of "NA" ("not available"). In the following, $F_t$ is used a short notation to denote the video field at time t.

Figure 1:
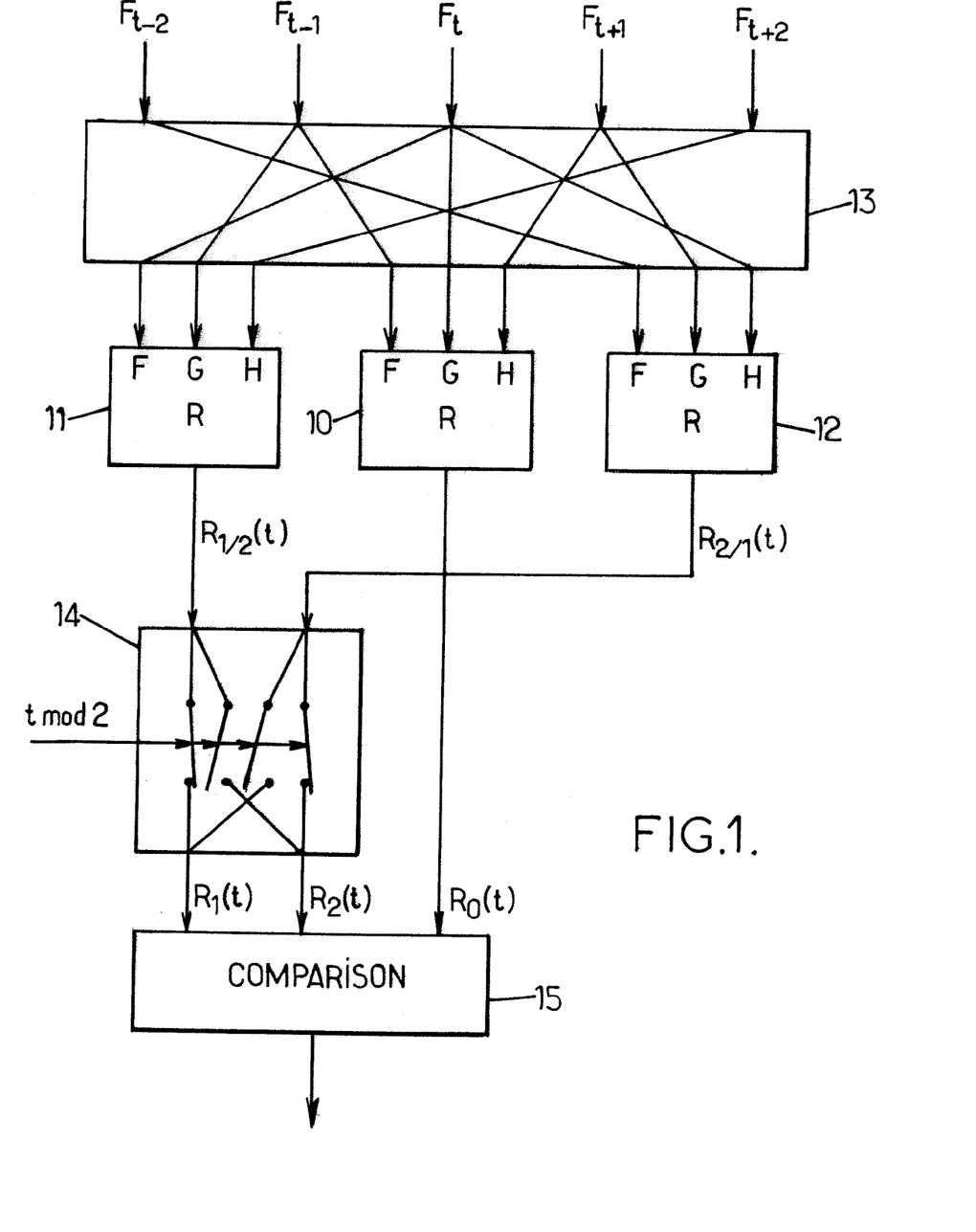
FIG. 1 is a block diagram of an embodiment of an interlaced video signal analyzer.

The block diagram of FIG. 1 illustrates the proposed method of analyzing the interlaced video signal S, in an exemplary embodiment. At the input of the analyzer, five consecutive fields $F_{t-2}$, $F_{t-1}$, $F_t$, $F_{t+1}$ and $F_{t+2}$ (or more) are received in view of computing three metric values with respect to time t:
- a first metric $R_0(t)$ estimating temporal regularity of the input field sequence;
- a second metric $R_1(t)$ estimating temporal regularity of a modified field sequence corresponding to the input field sequence in which field pairs of the form (2k, 2k+1) have been swapped;
- a third metric $R_2(t)$ estimating temporal regularity of another modified field sequence corresponding to the input field sequence in which field pairs of the form (2k−1, 2k) have been swapped.

Each metric $R_0(t)$, $R_1(t)$, $R_2(t)$ is computed using an identical function block "R" applying the temporal regularity estimation process to different inputs. In FIG. 1, the temporal regularity estimate has a support of three input fields F, G, H. It will be appreciated that a similar construction can be devised for more than three input fields. For example, the metric can be defined as a sum over unknown reference pixels of the central field G of a minimal directional variation of the field sequence at these pixels:

$$R(F, G, H) = \sum_{\substack{(x,y) \\ G(x,y)=NA}} \min_{(u,v) \in AS(t)} L(F, G, H; x, y, u, v) \quad (1)$$

In (1), AS(t) is a set of candidate displacements (u, v) along time. Typically, for an interlaced signal, u can be any integer and v an even integer only. The set AS(t) can be fixed. Advantageously, AS(t) is changing for every field. It may be computed from a set of candidate directions $D_t$ determined as described in WO 2009/087493 A1, by constraining the set $D_t$ to be a set of space-time directions of the form (u, v, 1) and by taking AS(t) as the set of all pairs (u, v) where (u, v, 1) is in $D_t$.

L(F,G,H; x,y; u,v) is a loss value providing a regularity measure of the sequence of fields F, G, H of alternating parities. It is defined for x and y such as G(x, y)=NA (and thus F(x, y±1)=NA and H(x, y±1)=NA). In an embodiment, L(F, G,H; x,y, u,v) is defined as:

$$L(F,G,H;x,y,u,v)=\alpha \times Grad(F,G,H;x,y,u,v)+\beta \times Ins(F,G,H;x,y,u,v)$$

where Grad(F,G,H; x,y, u,v) is a gradient component representing a discrete directional gradient measure, Ins(F,G,H; x,y, u,v) is an insertion component and α, β are non-negative mixing weights. If α>0 and β=0, the loss value only has the gradient component. If α=0 and β>0, the loss value only has the insertion component. Preferably, α>0 and β>0.

The gradient component Grad(F,G,H; x,y, u,v) is measuring how the video sequence is varying in space and time along the displacement (u, v). For example, it can be defined as:

$$Grad(F,G,H;x,y,u,v)=|H(x+u,y+v)-F(x-u,y-v)|$$

Figure 2:
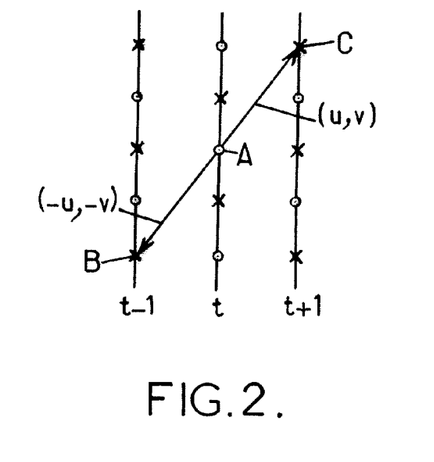
FIGS. 2 and 3 are diagrams illustrating different ways of obtaining a metric representative of temporal regularity of the interlaced video signal.

This is illustrated in FIG. 2, where a slice of the video sequence in time and y coordinates is represented in the case of the input field sequence (i.e. $F=F_{t-1}$, $G=F_t$, $H=F_{t+1}$). In FIG. 2, a cross represents a pixel position where the source signal is known (value≠NA), and a circle a pixel position where the source signal is unknown (value=NA). Pixel A is at the space-time index (x, y, t) where the signal is unknown, pixel B at (x−u, y−v, t−1) and pixel C at (x+u, y+v, t+1). The gradient component is a discrete directional derivative of the video signal along the space-time direction (2u, 2v, 2).

The insertion component Ins(F,G,H; x,y, u,v) is a measure of how well sample pixels picked in the F and H fields along the displacement vector (u, v) fit in the neighborhood of known pixels in G around (x, y), i.e. of pixels x+dx, y+dy that have a value different from NA in G. In an embodiment, the insertion component Ins(F,G,H; x,y, u,v) is an interval-insensitive loss function as described in WO 2007/115583 A1.

In another embodiment, the insertion component is simply the distance of an interpolated pixel value $r_{x,y,u,v}$ to an interval $I_{x,y}$ bound by the pixel values G(x, y+1), G(x, y−1) at positions immediately above and immediately below the position (x, y):

$$Ins(F,G,H;x,y,u,v)=d(r_{x,y,u,v},I_{x,y}) \quad (4)$$

where the interpolated pixel value $r_{x,y,u,v}$ is a mean value between H(x+u, y+v) and F(x−u, y−v), i.e.

$$r_{x,y,u,v} = \frac{H(x+u, y+v) + F(x-u, y-v)}{2},$$

and the distance d(r, I) of a real number r to an interval I=[a, b] of real numbers (a≤b) is the Hausdorff distance between the sets {r} and I:

$$d(r, l) = \begin{cases} 0 & \text{if } r \in I \\ a-r & \text{if } r < a \\ r-b & \text{if } r > b \end{cases} \quad (5)$$

Figure 3:
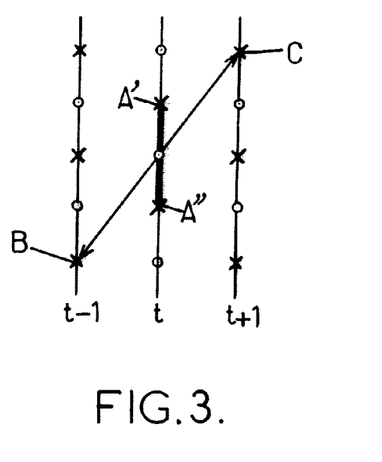

This insertion component is illustrated in FIG. 3 in the case of the input field sequence (i.e. $F=F_{t-1}$, $G=F_t$, $H=F_{t+1}$). Again, pixel A is at the space-time index (x, y, t) where the signal is unknown, pixel B at (x−u, y−v, t−1) and pixel C at (x+u, y+v, t+1). Pixels A' and A" belong to the central field G at space-time indexes (x, y+1, t) and (x, y−1, t), respectively, where the source video is known. The insertion component Ins(F,G,H; x,y, u,v) is computed by defining at the pixel position (x, y) in G an interval $I_{x,y}$ generated by the adjacent pixel values at A' and A": $I_{x,y}$=[Min{G(x, y+1), G(x, y−1)}, Max{G(x, y+1), G(x, y−1)}]. The insertion component is then the distance of the candidate directional interpolant $$r_{x,y,u,v} = \frac{H(x+u, y+v) + F(x-u, y-v)}{2}$$

to the interval $I_{x,y}$.

In yet another embodiment, an interval $I_{x,y}$ is determined for an unknown pixel x, y of the center frame G (i.e. for which G(x, y)=NA), either as $I_{x,y}$=[Min{G(x, y+1), G(x, y−1)}, Max{G(x, y+1), G(x, y−1)}] or as described in WO 2007/115583 A1, and the insertion component is defined as:

$$\text{Ins}(F, G, H; x, y, u, v) = \text{Min}\{d(r_{x,y,u,v}, l_{x,y}); d(r'_{x,y,u,v}, l_{x,y}); d(r''_{x,y,u,v}, l_{x,y})\}$$

where:

$$r_{x,y,u,v} = \frac{H(x+u, y+v) + F(x-u, y-v)}{2},$$

$$r'_{x,y,u,v} = \frac{H(x+2u, y+2v) + F(x, y)}{2}, \text{ and}$$

$$r''_{x,y,u,v} = \frac{H(x, y) + F(x-2u, y-2v)}{2}.$$

The motivation of this form of insertion component is that is takes very low values if motion is uniform from one frame to the next (video cadence) or conforming to a 2:2 cadence with either even or odd grouping of fields.

In FIG. 1, the temporal regularity estimation process R determines a metric measuring temporal regularity of an interlaced video signal, with or without field swaps. We denote:

$R_0(t)$ the first metric at time t of the original field sequence, namely with $F=F_{t-1}$, $G=F_t$, $H=F_{t+1}$;

$R_{1/2}(t)$ the metric obtained with $F=F_t$, $G=F_{t-1}$, $H=F_{t+2}$, i.e. by swapping the pairs $(F_{t-1}, F_t)$ and $(F_{t+1}, F_{t+2})$;

$R_{2/1}(t)$ the metric obtained with $F=F_{t-2}$, $G=F_{t+1}$, $H=F_t$, i.e. by swapping the pairs $(F_{t-2}, F_{t-1})$ and $(F_t, F_{t+1})$;

$R_1(t)$ the second metric of the field sequence in which fields 2k and 2k+1 are swapped for all integers k; and $R_2(t)$ the third metric of the field sequence in which fields 2k−1 and 2k are swapped for all integers k.

In the circuit arrangement shown in FIG. 1, the metrics $R_0(t)$, $R_{1/2}(t)$ and $R_{2/1}(t)$ are computed by a temporal regularity estimation stage consisting of three blocks 10, 11, 12 applying the same temporal regularity estimation process R which can be in accordance with one of the examples discussed above. The blocks 10, 11, 12 receive their respective F, G and H inputs from a field distribution stage embodied as a multiplexer 13. The multiplexer 13 receives the input field sequence of the interlaced video signal and obtains the two permuted sequences by swapping fields of the input sequence. The three sequences are provided as the relevant F, G and H input fields to the blocks 10, 11, 12.

When t is even, we have $R_1(t)=R_{1/2}(t)$ and $R_2(t)=R_{2/1}(t)$, whereas when t is odd, we have $R_1(t)=R_{2/1}(t)$ and $R_2(t)=R_{1/2}(t)$. In the schematic representation of FIG. 1, a switch 14 controlled by the parity of t obtains $R_1(t)$ and $R_2(t)$ from the outputs $R_{1/2}(t)$ and $R_{2/1}(t)$ of the metric computation blocks 11 and 12.

In order to determine the time arrangement of the fields in the input field sequence, the first, second and third metrics $R_0(t)$, $R_1(t)$, $R_2(t)$ are passed to a comparison stage 15. The metrics are compared to each other in order to assess the detected cadence and/or to detect a field inversion. For example, the decision may rely on the following scenarios:

(i) if $R_1(t) \approx R_0(t) < \rho \times R_2(t)$, a 2:2 cadence is detected, with frames consisting of two fields grouped as (2k, 2k+1). This case is referred to as "2:2 with phase 1 grouping";

(ii) if $R_2(t) \approx R_0(t) < \rho \times R_1(t)$, a 2:2 cadence is detected, with frames consisting of two fields grouped as (2k−1, 2k). This case is referred to as "2:2 with phase 2 grouping";

(iii) if $R_1(t) < \rho \times \text{Min}\{R_0(t); R_2(t)\}$, a field inversion is detected. The fields need to be swapped using the pairwise permutations (2k, 2k+1);

(iv) if $R_2(t) < \rho \times \text{Min}\{R_0(t); R_1(t)\}$, a field inversion is detected. The fields need to be swapped using the pairwise permutations (2k−1, 2k);

(v) else a video cadence is detected or another kind of cadence detection process must be used.

The 2:2 cadence with phase 1 grouping yields $R_1(t)$ and $R_0(t)$ of the same order of magnitude ($R_1(t) \approx R_0(t)$) and substantially smaller than $R_2(t)$ because swapping fields 2k and 2k+1 does not change significantly the metric, whereas swapping fields 2k−1 and 2k introduces temporal irregularity which penalizes $R_2(t)$. Symmetrically, the same considerations apply to detection of the 2:2 cadence with phase 2 grouping. In the conditions (i)-(iv), ρ is a parameter controlling the aggressiveness of the cadence detector (0<ρ<1). The notation "$R_i(t) \approx R_0(t)$" (i=1 or 2) means that the two metrics are of the same order of magnitude, which can be decided, for example, using another parameter γ close to 1 such that $\rho \leq \gamma \leq 1$: $R_i(t) \approx R_0(t)$ if $\gamma < R_i(t)/R_0(t) < 1/\gamma$.

Conditions (iii) and (iv) make it possible to detect field inversions. When a field inversion is detected (which can be caused by an edition error in a DVD or in a broadcasted stream), the fields intended for the deinterlacer can be swapped to correct the inversion. The swapped fields can then, at next time ranks, be again analyzed to determine whether the cadence is video or 2:2 (or something else such as 3:2). Field inversions can thus be seamlessly corrected.

The frame level operations, when done using software, can rely on previously computed decisions in order to improve the robustness of the method even further, since the cadence is normally a stable feature of a video content.

Different implementations of the interlaced video signal analyzer can be designed. In the example shown in FIG. 1, there are three blocks 10-12 for computing the metrics $R_0(t)$, $R_{1/2}(t)$ and $R_{2/1}(t)$ and a multiplexer 13 for supplying the relevant fields of the input sequence to the three blocks. Alternatively, there can be only one metric computation block receiving alternatively unswapped fields, swapped (phase 1) fields and swapped (phase 2) fields from the field distribution stage.

Figure 4:
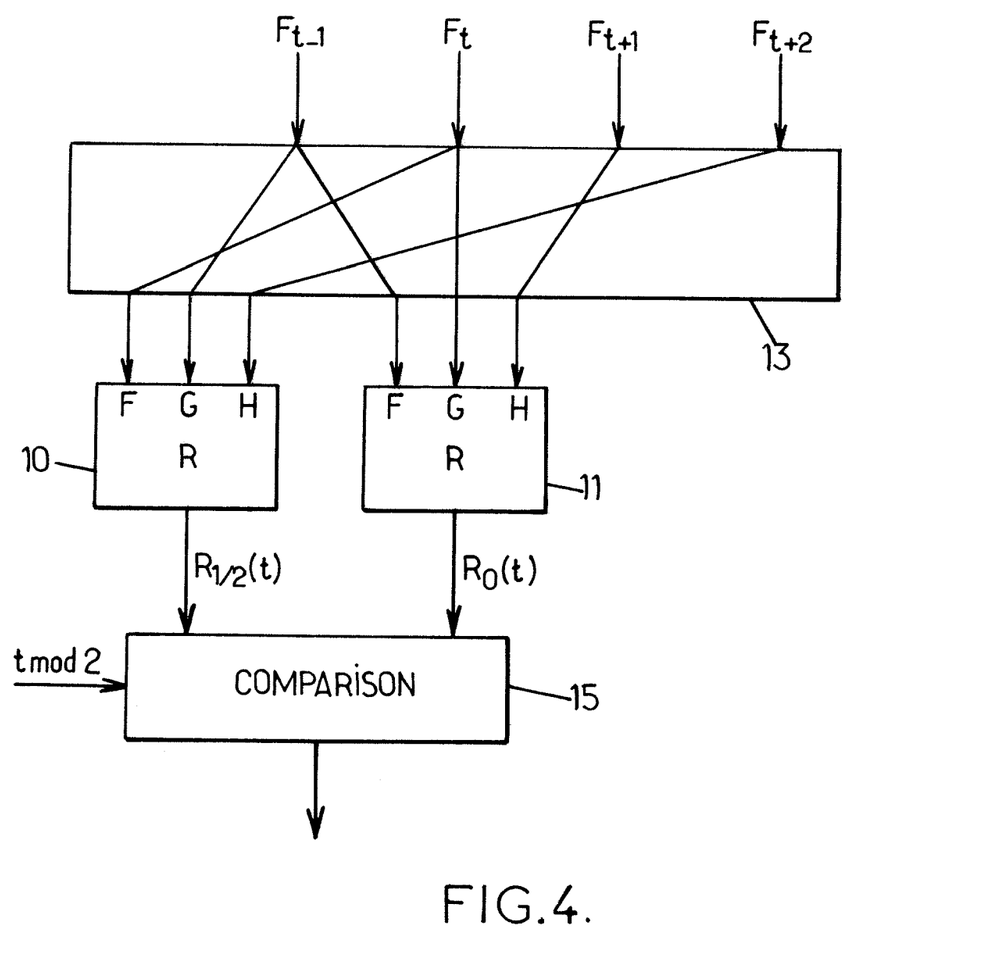
FIG. 4 is a block diagram of another embodiment of the interlaced video signal analyzer.

Since $R_0(t)$, $R_1(t)$ and $R_2(t)$ typically have a relatively smooth time evolution, it is possible not to compute the three metrics for each time index t, the comparison being applied to metrics computed with slight time offsets. FIG. 4 illustrates such an embodiment. In this example, there are only two blocks 10, 11 in the temporal regularity estimation stage to compute $R_0(t)$ and $R_{1/2}(t)$ as described above. The comparison stage 15 then receives $R_0(t)$ for all ranks t, $R_1(t)$ for the even ranks t and $R_2(t)$ for the odd ranks t. It can decide the time arrangement of the fields using, for example, criteria expressed as (i)-(v) above. The embodiment of FIG. 4 computes the temporal regularity metric for only one field swap candidate at each field index t. It reduces the computational burden compared to the embodiment of FIG. 1, which can translate into internal memory, logic size or increased bandwidth in an integrated circuit design.

Another way of reducing complexity of the interlaced video signal analyzer consists in computing the metrics over fewer reference pixels. The pixel positions (x, y) involved in the above-mentioned sum (1) can be chosen in the output frames with a scarce distribution to reduce computational complexity. The density of reference pixels (x, y) in (1) can be adjusted in a complexity vs. sensitivity tradeoff.

A selection of the reference pixels (x, y) over which the sum (1) is performed can also be used to provide a local detection of the cadence of the interlaced signal. The detection can thus take place region by region, which is useful in the case of video contents including a mix of 2:2 pulldown and video cadence, for example when inserts (of the video type) are to be displayed together with telecine, or in other cases of compounds images.

Figure 5:
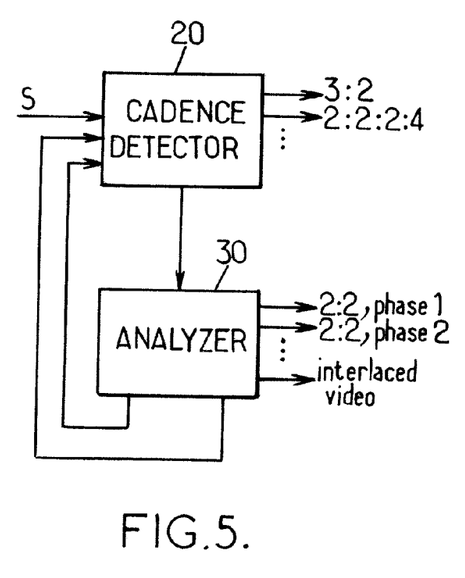
FIGS. 5 and 6 are block diagrams of cadence detection devices making use of the interlaced video signal analyzer.
Figure 6:
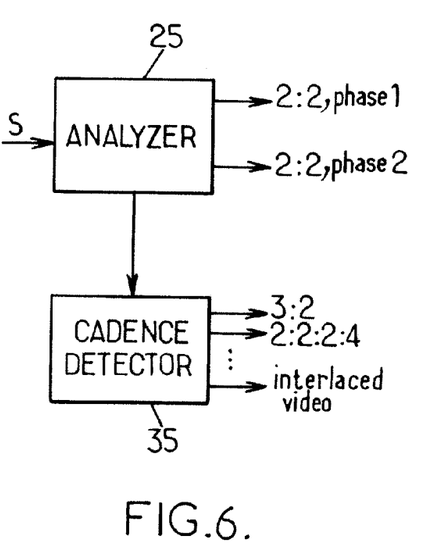

Examples of cadence detection devices making use of the above-described interlaced video signal analyzer are illustrated in FIGS. 5 and 6.

In the embodiment of FIG. 5, the interlaced video signal S to be analyzed is first supplied to a cadence detector 20 arranged to detect pulldown modes other than 2:2, e.g., 3:2, 2:2:2:4, etc., by conventional time correlation methods as mentioned in the introduction of the present disclosure. When none of these pulldown modes is detected, the subsequent fields of the signal S are passed to the analyzer 30 which can be of the type shown in FIG. 1 or 4. Based on the above conditions (i)-(v), the analyzer 30 detects one of:
- 2:2 pulldown, phase 1;
- 2:2 pulldown, phase 2;
- field inversion, phase 1;
- field inversion, phase 2;
- interlaced video, which is detected if none of the conditions (i)-(iv) is observed.

If a field inversion is detected, the information of which pairs of fields need to be swapped is fed back to the input of the device in order to carry out cadence detection from the corrected field sequence. The corrected field sequence can be supplied either to the conventional cadence detector 20 or to the analyzer 30.

In the embodiment of FIG. 6, the interlaced video signal S is first supplied to the analyzer 25 to detect any 2:2 cadence when condition (i) or (ii) is observed in the comparison stage 15. Otherwise, the subsequent fields of the signal S are passed to a conventional cadence detector 35 to detect pulldown modes other than 2:2, e.g., 3:2, 2:2:2:4, etc., or the interlaced video cadence if no sharp time correlation pattern appears in the input fields. The exemplary device of FIG. 6 assumes that no field inversion takes place in the input signal S. It is easily adapted to take such inversions into account by swapping fields pairwise when the analyzer 25 detects condition (iii) or (iv).

While a detailed description of exemplary embodiments of the invention has been given above, various alternative, modifications, and equivalents will be apparent to those skilled in the art. Therefore the above description should not be taken as limiting the scope of the invention which is defined by the appended claims.

The invention claimed is:

1. A method of analyzing an interlaced video signal including a first sequence of fields having respective integer ranks, the method comprising:
applying a temporal regularity estimation process to the first sequence of fields to compute a first metric, wherein inputs of the temporal regularity estimation process include pixel values from at least two fields having respective ranks differing by more than one such that the first sequence of fields comprises at least fields F(k−1), F(k), and F(k+1) for any integer k;
applying the temporal regularity estimation process to a second sequence of fields to compute a second metric, wherein the second sequence of fields is derived from the first sequence by swapping fields having ranks of the form 2k with fields having ranks of the form 2k+1 for any integer k where rank 2k and rank 2k+1 exist in the first sequence of fields such that the second sequence of fields comprises at least fields F(k−1), F(k), and F(k+2);
applying the temporal regularity estimation process to a third sequence of fields to compute a third metric, wherein the third sequence of fields is derived from the first sequence by swapping fields having ranks of the form 2k−1 with fields having ranks of the form 2k for any integer k where ranks 2k−1 and 2k exist in the first sequence of fields such that the third sequence of fields comprises at least fields F(k−2), F(k), and F(k+1);
swapping the value of the second metric with the value of the third metric when an integer time metric is odd; and
comparing the first, second and third metrics in a determination of a time arrangement of the fields in the first sequence.

2. The method as claimed in claim 1, wherein the determination of the time arrangement comprises:
a/ if the first and second metrics are of the same order of magnitude and substantially smaller than the third metric, detecting a 2:2 cadence in the first sequence of fields such that a frame to be displayed combines two fields having ranks of the form 2k and 2k+1 for an integer k; and
b/ if the first and third metrics are of the same order of magnitude and substantially smaller than the second metric, detecting a 2:2 cadence in the first sequence of fields such that a frame to be displayed combines two fields having ranks of the form 2k−1 and 2k for an integer k.

3. The method as claimed in claim 2, wherein the determination of the time arrangement further comprises:
c/ if the second metric is substantially smaller than both the first and third metrics, detecting a field inversion in the first sequence of fields such that fields having ranks of the form 2k and 2k+1 are inverted for an integer k; and
d/ if the third metric is substantially smaller than both the first and second metrics, detecting a field inversion in the first sequence of fields such that fields having ranks of the form 2k−1 and 2k are inverted for an integer k.

4. The method as claimed in claim 3, further comprising, in response to detection of a field inversion:
correcting the first sequence of fields by swapping pairwise the inverted fields of the first sequence; and
providing the corrected first sequence of fields to a cadence detector.

5. The method as claimed in claim 3, wherein the determination of the time arrangement further comprises:
e/ if none of conditions a/, b/, c/ and d/ is fulfilled, detecting a video cadence in the first sequence of fields.

6. The method as claimed in claim 3, wherein the determination of the time arrangement further comprises:
e'/ if none of conditions a/, b/, c/ and d/ is fulfilled, providing the first sequence of fields to a cadence detector arranged to detect cadences other than 2:2.

7. The method as claimed in claim 1, wherein a metric computed for a field rank t in a given sequence of fields by applying the temporal regularity estimation process to the given sequence of fields includes a sum of minimum loss values respectively associated with reference pixels having no pixel value in the field of rank t of the given sequence,
wherein the minimum loss value associated with a reference pixel is obtained by minimizing, over a set of candidate displacements, a loss function depending on pixels values provided in at least two fields having respective ranks differing by more than one in the given sequence at pixel positions determined from a position of the reference pixel and a candidate displacement.

8. The method as claimed in claim 7, wherein the loss function has a gradient component given by a distance between a pixel value provided at a position (x+u, y+v) in the field of rank t+1 of the given sequence of fields and a pixel value provided at a position (x−u, y−v) in the field of rank t−1 of the given sequence of fields, where (x, y) denotes the position of the reference pixel and (u, v) is the candidate displacement.

9. The method as claimed in claim 7, wherein the loss function has an insertion component given by a distance of an interpolated pixel value to an interval of pixel values, wherein said interpolated pixel value is a mean value between a pixel value provided at a position (x+u, y+v) in the field of rank t+1 of the given sequence of fields and a pixel value provided at a position (x−u, y−v) in the field of rank t−1 of the given sequence of fields, where (x, y) denotes the position of the reference pixel and (u, v) is the candidate displacement, and wherein said interval of pixel values has bounds given by two respective pixel values provided at positions immediately above and immediately below the position (x, y) of the reference pixel in said field of rank t.

10. The method as claimed in claim 7, wherein the loss function has an insertion component given by a minimum between a distance of a first interpolated pixel value to an interval of pixel values, a distance of a second interpolated pixel value to said interval of pixel values and a distance of a third interpolated pixel value to said interval of pixel values, wherein the first interpolated pixel value is a mean value between a pixel value provided at a position (x+u, y+v) in the field of rank t+1 of the given sequence of fields and a pixel value provided at a position (x−u, y−v) in the field of rank t−1 of the given sequence of fields, where (x, y) denotes the position of the reference pixel and (u, v) is the candidate displacement, wherein the second interpolated pixel value is a mean value between a pixel value provided at a position (x+2u, y+2v) in said field of rank t+1 and a pixel value provided at the position (x, y) in said field of rank t−1, wherein the third interpolated pixel value is a mean value between a pixel value provided at the position (x, y) in said field of rank t+1 and a pixel value provided at a position (x−2u, y−2v) in said field of rank t−1, and wherein said interval of pixel values has bounds given by two respective pixel values provided at positions immediately above and immediately below the position (x, y) of the reference pixel in said field of rank t.

11. An interlaced video signal analyzer, the analyzer comprising:

a temporal regularity estimation stage arranged for receiving a plurality of input field sequences and, for each input field sequence, computing a respective metric based on pixel values from at least two fields having respective ranks differing by more than one in said input field sequence;

a field distribution stage arranged for receiving an interlaced video signal as a first sequence of fields comprising at least fields F(k−1), F(k), and F(k+1) for any integer k, for deriving a second sequence of fields by swapping fields of the first sequence having ranks of the form 2k with fields of the first sequence having ranks of the form 2k+1 for any integer k where rank 2k and rank 2k+1 exist in the first sequence of fields such that the second sequence of fields comprises at least fields F(k−1), F(k), and F(k+2) and a third sequence of fields by swapping fields of the first sequence having ranks of the form 2k−1 with fields of the first sequence having ranks of the form 2k for any integer k where rank 2k−1 and rank 2k exist in the first sequence of fields such that the third sequence of fields comprises at least fields F(k−2), F(k), and F(k+1), and for providing the first, second and third sequences as input field sequences to the temporal regularity estimation stage;

a switching stage for swapping the value of a metric associated with the second sequence of fields with the value of a metric associated with the third sequence of fields when an integer time metric is odd; and a comparison stage for comparing first, second and third metrics computed by the temporal regularity estimation stage for the first, second and third sequences, respectively.

12. The interlaced video signal analyzer as claimed in claim 11, wherein the temporal regularity estimation stage is arranged for computing a metric with respect to a field rank t in the input field sequence as a sum of minimum loss values respectively associated with reference pixels having no pixel value in the field of rank t of said input field sequence, wherein the minimum loss value associated with a reference pixel is obtained by minimizing, over a set of candidate displacements, a loss function depending on pixels values provided in at least two fields having respective ranks differing by more than one in said input field sequence at pixel positions determined from a position of the reference pixel and a candidate displacement.

13. The interlaced video signal analyzer as claimed in claim 12, wherein the loss function has a gradient component given by a distance between a pixel value provided at a position (x+u, y+v) in the field of rank t+1 of the input field sequence and a pixel value provided at a position (x−u, y−v) in the field of rank t−1 of the input field sequence, where (x, y) denotes the position of the reference pixel and (u, v) is the candidate displacement.

14. The interlaced video signal analyzer as claimed in claim 12, wherein the loss function has an insertion component given by a distance of an interpolated pixel value to an interval of pixel values, wherein said interpolated pixel value is a mean value between a pixel value provided at a position (x+u, y+v) in the field of rank t+1 of the input field sequence and a pixel value provided at a position (x−u, y−v) in the field of rank t−1 of the input field sequence, where (x, y) denotes the position of the reference pixel and (u, v) is the candidate displacement, and wherein said interval of pixel values has bounds given by two respective pixel values provided at positions immediately above and immediately below the position (x, y) of the reference pixel in said field of rank t.

15. The interlaced video signal analyzer as claimed in claim 12, wherein the loss function has an insertion component given by a minimum between a distance of a first interpolated pixel value to an interval of pixel values, a distance of a second interpolated pixel value to said interval of pixel values and a distance of a third interpolated pixel value to said interval of pixel values, wherein the first interpolated pixel value is a mean value between a pixel value provided at a position (x+u, y+v) in the field of rank t+1 of the input field sequence and a pixel value provided at a position (x−u, y−v) in the field of rank t−1 of the input field sequence, where (x, y) denotes the position of the reference pixel and (u, v) is the candidate displacement, wherein the second interpolated pixel value is a mean value between a pixel value provided at a position (x+2u, y+2v) in said field of rank t+1 and a pixel value provided at the position (x, y) in said field of rank t−1, wherein the third interpolated pixel value is a mean value between a pixel value provided at the position (x, y) in said field of rank t+1 and a pixel value provided at a position (x−2u, y−2v) in said field of rank t−1, and wherein said interval of pixel values has bounds given by two respective pixel values provided at positions immediately above and immediately below the position (x, y) of the reference pixel in said field of rank t.

* * * * *